United States Patent [19]
Strudgeon et al.

[11] 3,855,123
[45] Dec. 17, 1974

[54] UPFLOW-DOWNFLOW SORPTION PROCESS
[75] Inventors: George E. Strudgeon, Erie, Pa.; Andrew W. Loven, Vienna, Va.
[73] Assignee: Zurn Industries, Inc., Erie, Pa.
[22] Filed: Nov. 8, 1972
[21] Appl. No.: 304,601

[52] U.S. Cl.................. 210/31, 210/35, 210/82, 210/264
[51] Int. Cl............................................. B01d 15/06
[58] Field of Search............................. 210/33–35, 210/39, 96, 189, 252, 264, 275, 31 R

[56] References Cited
UNITED STATES PATENTS

| | | | |
|---|---|---|---|
| 330,907 | 11/1885 | Le Beau | 210/252 |
| 1,206,495 | 11/1916 | Aronowitz | 210/252 X |
| 1,818,638 | 8/1931 | McGill | 210/252 X |
| 1,903,958 | 4/1933 | Clark | 210/189 |
| 2,429,943 | 10/1947 | Prager | 210/39 X |
| 3,551,203 | 12/1970 | Corson et al. | 210/39 X |
| 3,638,590 | 2/1972 | Roberts et al. | 210/67 X |

Primary Examiner—Charles N. Hart
Assistant Examiner—Robert G. Mukai

[57] ABSTRACT

In a granular solid liquid purification system and process, the liquid to be purified is treated by passing it through a bed of sorptive material in a first of a pair of series-connected columns in an upflow direction and then through the bed of sorptive material in the second of these columns in a downflow direction. The first column removes the majority of the sorbate from the liquid, while the second column is a polishing column which removes smaller concentration of the sorbate.

3 Claims, 4 Drawing Figures

UPFLOW-DOWNFLOW SORPTION PROCESS

BACKGROUND OF THE INVENTION

This invention relates to liquid purification systems, and more particularly, to granular solid-liquid sorption systems for removing dissolved molecules from liquids.

For a great many years, liquids such as water have been treated to remove municipal and industrial wastes which have been deposited in them. In recent years, with a greater emphasis being placed on environmental protection, municipalities and industrial concerns have had to place an increased emphasis on obtaining an effluent having a high degree of purity from liquid waste removal systems.

Liquid waste removal systems are concerned with two basic types of operations, the removal of suspended solids from the liquids and the removal of dissolved materials from the liquids. Suspended solids, such as clays, bits of organic waste, and oil droplets, are removed by the use of sedimentation tanks, flotation tanks, flocculation systems, and screening. Dissolved material, including organic and inorganic compounds, are removed by processes such as reverse osmosis, electrodialysis, ion exchange, foam separation chemical oxidation or acid leaching, distillation and adsorption on activated carbon or alumina. Biological processes are used to remove biodegradeable organic materials whether in suspended or dissolved form.

This invention deals with the removal of dissolved materials through the use of granular solid-liquid sorption processes. That is, dissolved materials are removed from liquids through the use of processes in which granular solids are positioned in beds located in containers referred to as columns. As liquids are passed through these columns, the granular solids attract certain types of dissolved materials, depending upon the nature of the granular solid and the liquid used in the column. The molecules of these materials are deposited on the solids. Sorption processes include ion exchange and adsorption using activated carbon, activated alumina, or other adsorbents.

For ease of discussion, and without intending to limit this invention, the background of the invention will be further developed with particular reference to a carbon adsorption process with which it has been used for removing waste material from water. In an adsorption process, the adsorbent, activated carbon in this instance, attracts molecules of the dissolved materials to it because of the porous structure of the carbon. Each granule of the activated carbon contains a vast, interconnected network of pores of various sizes, providing a large surface area for adsorbing molecules and thus a large adsorption capacity. The molecules of the dissolved materials are lodged in the pores. These molecules are retained in the pores until they are removed, for example, by thermal regeneration of the activated carbon which uses heat to release the previously dissolved molecules from the carbon.

The concentration of organic waste material in a liquid such as water may be measured in terms of biochemical oxygen demand (BOD) and chemical oxygen demand (COD) or other convenient terms. Each of these terms measures the amount of waste material in a sample of water in terms of the quantity of oxygen required to react this waste material under prescribed conditions. BOD is a measure of the oxygen required by bacteria to degrade the waste material under prescribed conditions for a 5-day period of time. COD is a measure of the equivalent amount of oxygen required for a strong oxidizing agent to oxidize the waste material to carbon dioxide and water under prescribed conditions. Both BOD and COD are expressed in milligrams per liter (mg/1).

The BOD and COD levels of the influent, the water flowing into an activated carbon system, and the BOD and the COD levels of the effluent, the water flowing out of such a system, are continuously measured. These systems are designed to keep the BOD and/or COD level of the effluent below a prescribed amount. When the level of the BOD or the COD of the effluent rises above this amount, a "breakthrough" is said to occur and the sorbent material, the activated carbon in this case, must be replaced.

The activated carbon adsorbs dissolved molecules of contaminants from water by remaining in contact with the water for a prescribed residence time. This time depends on the rate of adsorption of the adsorbent, the activated carbon, and the adsorption isotherm of the activated carbon. The "adsorption isotherm" is the relationship between adsorptive capacity and equilibrium capacity of the activated carbon adsorbent at a given constant temperature. It is expressed as a function of both the amount of adsorbate which is adsorbed per unit weight of activated carbon and the concentration of adsorbate in the water.

In a batch type of system, the type of system which normally uses powdered carbon as an adsorbent, the liquid to be purified and the activated carbon are placed in a container for the prescribed residence time. At the end of this period of time, the carbon is filtered from the purified liquid and used as desired. Powdered carbons are also used in continuous flow systems with the carbon first being mixed into the liquid being treated, adsorption allowed to take place in a reaction, and the carbon filtered out in a continuous filter or sedimentation operation.

In granular carbon systems, a waste water is purified by being percolated through either one or a number of columns containing the activated carbon adsorbent. Where more than one column is used, the columns themselves are connected in series, in parallel, or in series-parallel combination. The size of the column or columns used is such that the liquid to be purified remains in contact with the adsorbent for the prescribed residence time. In practice, the beds of carbon adsorbent contain voids which cause the liquid to channel through some portion of the bed without uniformly contacting the adsorbent. The length of the carbon column must be such that the effects of this channeling are minimized so as to increase the efficiency of the adsorption system.

Influent passes through any single column of adsorbent in either an upflow direction, that is from the lower end of the column to the upper end of the column, or in a downflow direction, from the upper end of the column to the lower end of the column. Both the upflow and the downflow types of adsorption systems have their advantages and disadvantages. In the upflow system, the bed of carbon adsorbent is partially expanded by the upward flow of the liquid, mixing the adsorbent within the bed.

Furthermore, in the upflow system, the nozzles which pass the influent to the bed are generally designed so that the suspended particles which may be present can be passed through them. Thus, an upflow system can tolerate suspended particles which tend to accumulate or grow within downflow columns and greater service times between backwashs are achieved.

In the downflow system, the drain at the bottom of the column only passes clean effluent and, thus need not be designed to pass suspended particles. The carbon bed itself acts as a filter which prevents fine particles of carbon from being contained in the effluent. However, a schmutzdecke, a layer of fine particles of suspended solids and carbon, tends to develop on the upper surface of the bed of a downflow column causing a pressure head loss to develop. As a result, downflow columns must be backwashed more often than upflow columns so as to remove this schmutzdecke. Furthermore, because the drain system is not designed to pass suspended particles of contaminant, downflow columns must be backwashed with clean effluent. This effluent must be stored as a part of the system to backwash the downflow columns.

Those skilled in the art have recognized that it is economically more advantageous to use two or more series-connected adsorption columns to obtain the required column length than it is to use a single column for this purpose. FIG. 1 of the drawings must be referred to obtain a full understanding of the reason for this reasoning. Assume that a single column has been operated until the COD level of the effluent water has exceeded the allowable maximum and, thus, a breakthrough has occurred. Assume also that the flow of water has been stopped at this point in the operation of the adsorption system and samples of carbon at various column lengths are removed and analyzed for the amount of COD loading of the carbon. FIG. 1 is a plot of the extent to which the carbon has been loaded by dissolved molecules along various lengths along the column.

It can be seen that maximum loading occurs at the portion of the column where the influent enters the column. The loading decreases toward the opposite end of the column. The crosshatched area shows the unused adsorptive capacity of the carbon in the single column at the time when breakthrough occurs. To obtain the required purity of the effluent, the entire amount of carbon in the column must be replaced at this time with fresh carbon. Thus, the unused capacity is wasted.

However, FIG. 2 shows the effects of using at least a pair of series-connected columns to obtain the required column length. At breakthrough, the loading characteristics of the carbon remain the same as with the single column of FIG. 1. However, only the carbon in the first of the two columns is replaced to cause the BOD or COD level of the effluent to decrease below the break-through level. The second column is then moved in to the upstream position to replace the first column and the two-stage series adsorption system is in operation once again. By removing only the carbon from the first column, the unused capacity of the second column can continue to be exhausted. This results in a more complete exhaustion of the adsorptive capacity of the activated carbon and a more efficient and economical system.

Prior to this invention, series-connected columns of any sorption system were all connected either in a series upflow manner or in a series downflow manner. That is, all of the columns would have the liquid flow through the sorbent material in the same direction. Either the system normally uses pressurized vessels for this purpose to force liquid to flow between columns, or a pumping station is provided between adjacent stages to force the liquid through the succeeding stage.

The comments above on granular activated carbon adsorption systems apply equally well to ion exchange resin, activated alumina, and other granular solid liquid adsorption systems.

BRIEF DESCRIPTION OF THE INVENTION

It is an object of this invention to provide an improved and more economical liquid sorption system and process using series-connected columns of sorbent material.

It is another object of this invention to provide liquid sorption systems and processes which use the advantages of both the upflow-type series sorption system and the downflow-type series sorption system.

It is still a further object of this invention to provide a liquid sorption system and process in which columns containing beds of sorptive material are interconnected in a series relationship through the use of a decreased amount of piping and valving as compared with prior art systems.

Briefly stated, and in accordance with one aspect of this invention, a granular solid liquid purification system and process comprises at least first and second series connected columns. Each of these columns contains a bed of sorptive material. An influent liquid is conveyed to the lower end of the first column so that this liquid percolates upwardly through the bed of the sorptive material to the upper end of the first column. This column is the roughing column which removes the majority of the sorbate from the influent liquid. The liquid is then passed from the upper end of the first column to the upper end of the second column. Thus, the liquid percolates downwardly through the bed of sorptive material in the second column to the lower end of this column. The second column is the polishing column removing smaller concentrations of sorbate from the liquid and filtering the liquid.

Upon breakthrough of the effluent from the series-connected columns, the first column can be replaced with the second column so that the second column is now the first to receive the influent, and the direction of liquid flow through this second column is reversed. The liquid then percolates upwardly through the sorptive bed of the second column as it acts as the roughing column.

DESCRIPTION OF PREFERRED EMBODIMENTS

Figure 1:
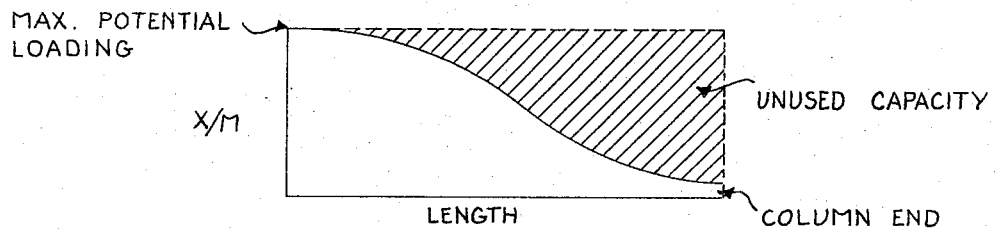
FIG. 1 is a typical graph showing the extent to which carbon along the length of a column is loaded by dissolved molecules at breakthrough of the effluent.
Figure 2:
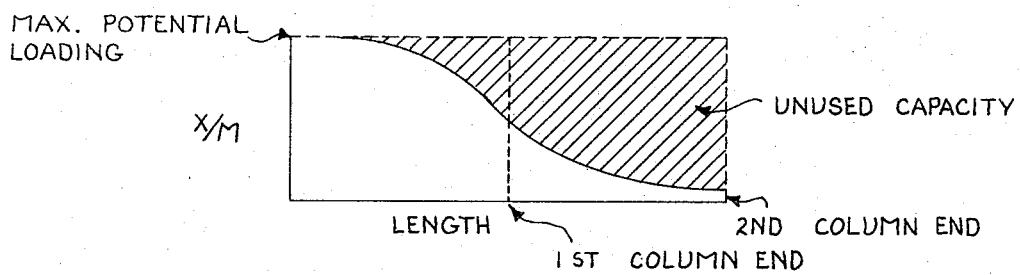
FIG. 2 is a graph similar to FIG. 1 as it applies to a pair of series-connected columns.
Figure 3:
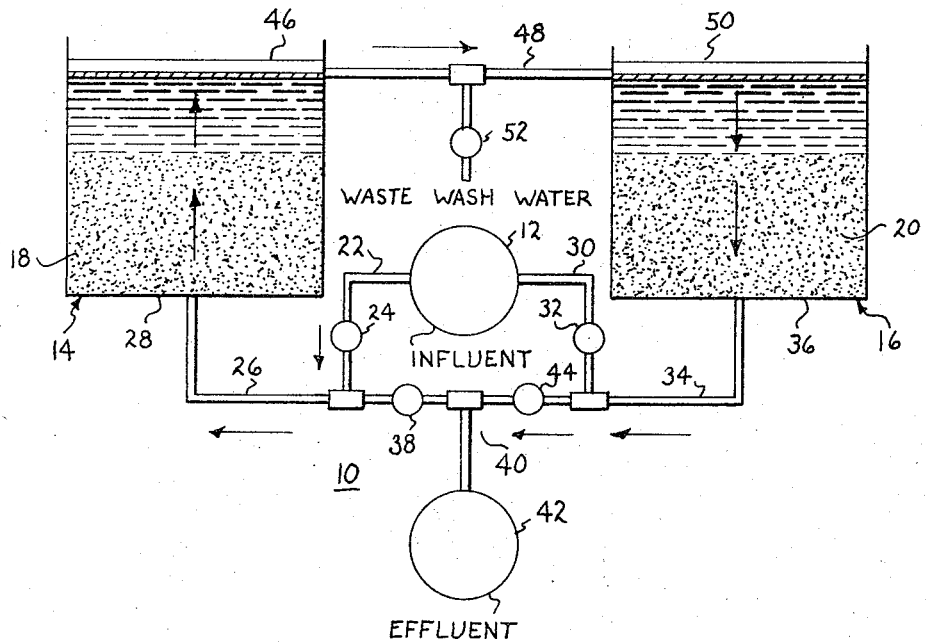
FIG. 3 is a schematic diagram showing one embodiment of this invention.

Referring now, more specifically, to the drawings and in particular to FIG. 3, the granular solid liquid purification system 10 and process of this invention are shown. Means 12 are shown for providing the influent liquid which is to be purified in accordance with this invention. Normally the means 12 comprise portions of liquid waste removal systems which remove suspended solids from the liquids. This invention is primarily concerned with removing dissolved materials from the influent liquids. The system 10 further includes a first column 14 and a second column 16, each of which contains a bed of sorptive material. The bed of sorptive material in column 14 is shown as the bed 18, while the sorptive material of the column 16 is shown as the bed 20. The sorptive material may comprise any of a number of granular solid sorbents which are used to remove dissolved materials from liquids. The type of sorbent used depends upon the sorption process which is required, and these processes include acid leaching, solvent extraction, ion exchange, and adsorption using activated carbon, activated alumina, or other adsorbents. To facilitate discussion of this invention, it will be described with respect to its use with an activated carbon adsorption process.

The influent liquid can be conveyed through piping 22, valve 24, and piping 26 to the lower end 28 of the column 14. The influent can also be conveyed through piping 30 and valve 32 and piping 34 to the lower end 36 of the column 16. In accordance with the manner in which the system and process of this invention operate, one of the valves 24 and 32 would be open to permit the flow of influent liquid, while the other would be closed.

The lower end 28 of the first column 14 is connected through the piping 26 and a valve 38 and a piping arrangement 40 to means 42 for receiving the effluent liquid from the system. Similarly, the lower end 36 of the column 16 is connected through piping 34 and a valve 44 and the piping 40 to the means 42 for receiving the effluent liquid.

The upper end 46 of the column 14 is connected through piping 48 to the upper end 50 of the column 16. A valve 52 is included to allow waste water to be removed from the columns 14 and 16 when these columns are backwashed to remove solid particles.

In accordance with this invention, the influent liquid is conveyed to the lower end of one of the columns, percolated upwardly through the bed of activated carbon in this column, conveyed from the upper end of this column to the upper end of the other column and percolated downwardly through the bed of activated carbon held in the second column. In this manner, dissolved molecules are efficiently and effectively removed from the influent to purify this liquid.

For example, assume that valves 24 and 44 are open, while valves 32 and 38 are in a closed position. Of course, valve 52 is in a closed position all during the normal operation of the liquid purification system and process. The influent liquid is conveyed through the piping 22 and the valve 24 and piping 26 to the lower end 28 of the first column 14. The liquid is then percolated through the activated carbon bed 18 of the column 14. As the volume of the liquid increases within the column 14, it eventually reaches the height so that it is conveyed through the piping 48 to the upper end 50 of the column 16. A launder system, used to collect column effluent and backwash water, can be used to distribute flow in the downflow bed. This liquid then percolates downwardly through the bed of activated carbon 20 in the column 16. The effluent from the column 16 is then removed from the system through the piping 34, the open valve 44 and the piping 40. The flow of liquid in this system continues as just described until a breakthrough occurs.

Upon detecting that a breakthrough has occurred, the flow of liquid within the system is terminated and the activated carbon bed 18 is removed from the column 14. This activated carbon is replaced with a fresh, regenerated bed of activated carbon and the system begins operation once again.

However, when operation of the system begins this time, the direction of liquid flow within each of columns 14 and 16 is reversed. That is, the valves 24 and 44 are closed and the valves 32 and 38 are maintained in an open position. Thus, the influent liquid flows through the piping 30, the valves 32, and the piping 34 to the lower end 36 of the column 16. This liquid is percolated in an upward direction through the activated carbon bed 20 and flows through the piping 48 to the upper end 46 of the column 14. The liquid then percolates through the activated carbon bed 18 in a downward direction. The effluent from the lower end 28 of the column 14 is then conveyed through the piping 26, the valve 38, and the piping 40 out of the illustrated liquid purification system.

After a period of operation, breakthrough occurs once again and the activated carbon bed 20 must be removed from the column 16 and replaced with regenerated carbon. After this occurs, the direction of liquid flow within the system is reversed to the original direction shown by the arrows in FIG. 3. The liquid is then purified by flowing through the column 14 in an upflow direction and by flowing through the column 16 in a downflow direction.

The upflow-downflow system and process of this invention make use of the advantages of both the upflow and the downflow types of systems which were heretofore used.

The upflow bed is used as the "roughing" bed which tends to remove any particulate matter which might have been contained in the influent to the system. Any fine particles of carbon which might be contained in the effluent from the upflow bed are filtered in the downflow bed which tends to polish this effluent.

Throughout the operation of this system, the columns 14 and 16 are operated as gravity fed open-top containers. Pressure vessels are not used, as are often required with some prior art systems. The liquid is conveyed from the upstream column to the downstream column by gravity feeding. Pumping stations are not required between the adjacent columns as is sometimes required with certain prior art systems and processes.

Furthermore, the use of the liquid purification system and process of this invention results in the use of less piping and fewer valves than with prior art systems.

Figure 4:
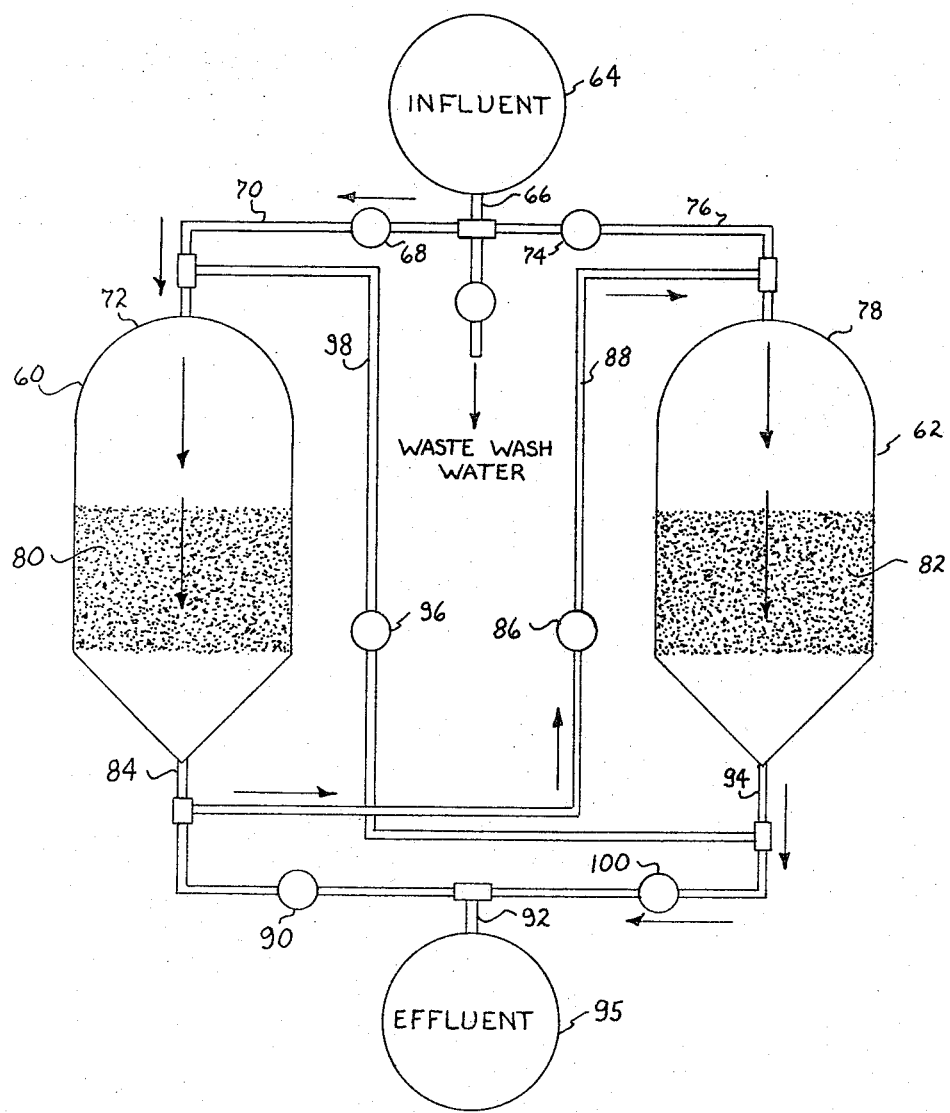
FIG. 4 is a schematic diagram of a prior art system showing the piping arrangements which is required.

By way of illustration, FIG. 4 shows a typical prior art downflow adsorption system in which the influent flows in a downward direction in both of a pair of columns 60 and 62. Influent can flow from a source 64 and through piping 66, a valve 68, and piping 70 to the upper portion 72 of the column 60. It can also flow from the source of influent 64 and the piping 66 through a valve 74 and piping 76 to an upper end 78 of the column 62. The columns 60 and 62 have beds of sorptive material 80 and 82, respectively. The effluent from the column 60 can flow through piping 84, a valve 86, and piping 88 to the upper end 78 of the column 62.

The effluent from the column 60 can also flow through the piping 84, a valve 90, and piping 92 to means 94, for receiving this effluent. Similarly, the effluent from the column 62 can flow through piping 94, a valve 96, and piping 98 to the upper end 72 of the column 60. It can also flow through the piping 94, a valve 100, and the piping 90 to the means for receiving the effluent 94.

Let us assume that the prior art system and process shown in FIG. 4 is operating in such a manner that the influent is first treated by the column 60 and then treated by the column 62. The valve 74 is closed and the valve 68 is open. This allows the influent to flow through the piping 66, the valve 68, and the piping 70 to the column 60. The influent then percolates in a downward direction through the bed 80 of sorbent material. The valve 90 is closed and the valve 89 opened. This allows the effluent to flow through the piping 84, the valve 86, and the piping 88, to the upper end of the columns 62. The liquid then percolates in a downward direction through the bed 82 of the column 62. The valve 96 is closed and the valve 100 is open. Thus, the effluent from the column 62 having been treated by the sorbent beds of both the columns 60 and 62, flows through the piping 94, the valve 100, the piping 92, and out of the purification system. The valve 96 and the piping 98 are used to convey the effluent liquid from the column 62 to the column 60 when the column 62 receives the influent first and the column 60 is used as the polishing column.

Comparing the schematic diagrams in FIGS. 3 and 4, it can be seen that FIG. 4 includes additional valves 86 and 96 and additional piping such as the piping 88 and 90 to convey the liquid from the lower end of one column to the upper end of the other column. The system and process of this invention avoid the necessity for this additional piping and the additional valve because the effluent from the upflow column 14 is merely transferred to the upper end of the downflow column 16. Referring to FIG. 3, the liquid from the upflow column 14 is conducted through the piping 48 at the upper end of this column and to the upper end of the column 16.

Furthermore, referring now to FIG. 4 once again, some additional force other than the pressure of the liquid itself is required to cause the liquid to flow from the lower end of one column to the upper end of another column. In some prior art systems, this force comprises pumps mounted in the piping lines between the lower end of a column and the upper end of another column. In other systems, the columns are operated under pressure and this pressure is used to force the liquid from the lower end of one column to the upper end of another column. While the liquid purification system and process of this invention could be operated in a pressurized system, it is possible to design the upflow-downflow system and process of this invention such that it is not required to be pressurized. Obviously, avoiding the pumps or avoiding a pressurized system substantially reduces the cost of such a system and also reduces its complexity.

Those skilled in the art will recoznize that the disclosure of this invention shown in FIG. 3 is only a schematic diagram intended to clearly illustrate the invention itself. The teachings of the prior art are sufficient to indicate how this invention can be incorporated into a practical liquid treatment system. Typical prior art systems are described and disclosed in the Process Design Manual For Carbon Adsorption for the Environmental Protection Agency comprising a technical publication of October, 1971, pursuant to program No. 17020GNR, contract No. 14-12-928, which manual is incorporated herein by reference. FIG. 5-7 on page 5-16 of this Process Design Manual shows a typical process flow diagram for a prior art down-flow system.

With regard to the design of the columns themselves, each of the columns should have a plenum chamber and/or nozzle liquid distribution system at the bottom thereof which is typical of many of the systems used for distributing liquid in upflow systems of the prior art. This facilitates the use of the column as an upflow column. Such nozzles or distributors are shown, by way of example, in FIG. 5-3 on page 5—5 of the Process Design Manual, supra. Furthermore, the column should also have a liquid distribution system which also facilitates its operation as a downflow column. Such a liquid distribution system is disclosed and claimed in U.S. Pat. No. 3,276,590 Schmid, et al., which is assigned to the assignee of this invention. Other convenient distribution systems known to those skilled in the art can also be used. U.S. Pat. No. 3,276,590 also shows a system for backwashing columns, that is, a system for cleansing the bed of particulate matter which tends to accumulate during the operation of the liquid purification system and cause a pressure drop across the individual columns. This pressure drop increases as the amount of particulate matter gathered in the bed increases, so that the liquid flow through the columns is substantially impaired. When the pressure drop across a column reaches a selected level, the column is backwashed. Liquid is forced through the bed of adsorbent material under pressure so that the material in the bed is churned, allowing the particulate matter collected in the bed to float to the top of the liquid level and be removed from the column. Following backwash, the operation of the system can continue.

Those skilled in the art will recognize that any practical sorption system made in accordance with principles of this invention may compromise more than the two sorption columns shown in FIG. 3 to illustrate the principles of this invention. FIGS. 5-7 on page 5-16 of the Process Design Manual, supra, shows the use of six columns in a system, two of which are actually purifying liquid and the other four of which are at various stages of backwash and carbon renewal and reactivation. The specific number of columns and design of the systems made in accordance with this invention will vary with the needs of the industry or municipality for which the systems are installed. Where more than two columns are used, after breakthrough the depleted upflow column may be completely removed from operating in a purifying mode and another column is then treated and reactivated while the system and process of this invention is still operating.

In any case, the depleted bed may be reactivated by removing the bed from the column and treating it, as by heat treatment to drive off impurities adsorbed in materials such as activated carbon. Or, in certain systems, such as in ion exchange systems, a bed of material may be regenerated in place within the column, as by passing a regenerating solution through the bed.

It is contemplated that those skilled in the art may find numerous uses for the upflow-downflow system and process of this invention beyond those specifically mentioned in this patent application. These uses may at least in part be based on the use of the upflow bed for primary treatment of a liquid and the use of the downflow bed for the polishing of the liquid. For example, it may be found that this invention is useful for certain applications of sand-type filters which remove particulate material from liquids.

Thus, it is to be understood that the embodiment of this invention set forth herein is described to present a full and clear description of this invention. The invention itself is not limited to the details of the particular embodiment presented and described, but it should be understood that it is capable of modification within a range of equivalents without departing from the true scope and spirit of this invention as defined in the appended claims.

What we now claim as new and desire to obtain by Letters Patent of the United States is as follows:

1. A process for treating liquid by passing the liquid through beds of granular solid, activated carbon comprising the steps of:
   a. providing at least first and second series-connected columns, each column containing a bed of granular solid, activated carbon;
   b. passing influent liquid to the lower end of the first column;
   c. forcing the liquid to pass upwardly through the bed of activated carbon contained in the first column;
   d. passing the liquid from the upper end of the first column to the upper end of the second column;
   e. receiving the effluent liquid from the lower end of the second column after the liquid has passed through the bed of the second column in the downward direction;
   f. periodically backwashing each of the columns after liquid has been treated in the columns;
   g. detecting the occurrence of a breakthrough with respect to the effluent liquid of the second column;
   h. removing the bed of activated carbon of only the first series-connected column from the treatment process after breakthrough is detected;
   i. providing a bed of fresh activated carbon in a column; thereafter, passing the influent liquid to the lower end of the second column and forcing the liquid to pass upwardly through the bed of activated carbon contained in the second column;
   j. passing the liquid from the upper end of the second column to the upper end of the column having fresh activated carbon; and
   k. receiving the effluent liquid from the lower end of the column containing the fresh activated carbon after the liquid has passed through the bed of this material in a downward direction.

2. A process for treating liquid by passing the liquid through beds of granular solid, activated carbon, comprising the steps of:
   a. providing at least first and second series-connected columns, each column containing a bed of granular solid, activated carbon;
   b. passing influent liquid to the lower end of the first column;
   c. forcing the liquid to pass upwardly through the bed of activated carbon contained in the first column;
   d. passing the liquid from the upper end of the first column to the upper end of the second column;
   e. receiving the effluent liquid from the lower end of the second column after the liquid has passed through the bed of the second column in the downward direction;
   f. periodically backwashing each of the columns after liquid has been treated in the columns;
   g. detecting the occurrence of a breakthrough with respect to the effluent liquid of the second column;
   h. providing only one bed of fresh activated carbon after breakthrough is detected;
   i. passing the influent liquid to the lower end of the second column and reversing the direction of liquid flow through the second column so that the influent passes through the bed of activated carbon contained in the second column in an upward direction; and
   j. receiving the effluent liquid from the lower end of the column containing the bed of fresh activated carbon after the liquid has passed through this bed of activated carbon in a downward direction.

3. A process for purifying liquid by passing through granular solid beds of activated carbon comprising the steps of:
   a. providing at least first and second series-connected columns, each containing a bed of granular solid, activated carbon;
   b. passing influent to the lower end of the first column;
   c. forcing the liquid to percolate upwardly through the bed of activated carbon contained in the first column;
   d. passing the liquid from the upper end of the first column to the upper end of the second column;
   e. percolating the liquid in a downward direction through the bed of activated carbon contained in the second column;
   f. periodically backwashing each of the columns after liquid has been treated in the columns;
   g. detecting the occurrence of a breakthrough with respect to the effluent liquid of the last-downstream series-connected column;
   h. removing the bed of activated carbon of only the first column from the purification process after breakthrough is detected;
   i. providing a bed of fresh granular solid activated carbon in a column;
   j. thereafter, passing the influent liquid to the lower end of the second column and forcing the liquid to pass upwardly through the bed of activated carbon contained in the second column; and
   k. percolating the liquid through the bed of fresh activated carbon as the last downstream, series-connected column.

* * * * *